(12) United States Patent
Fenny et al.

(10) Patent No.: US 6,227,481 B1
(45) Date of Patent: May 8, 2001

(54) METHOD AND APPARATUS FOR CONTROLLING FORCE FIGHTS IN A ROTATING SHAFT

(75) Inventors: Carlos Alexander Fenny, Arlington; Kenneth Eugene Builta, Euless, both of TX (US)

(73) Assignee: Bell Helicopter Textron, Inc., Fort Worth, TX (US)

( * ) Notice: Subject to any disclaimer, the term of this patent is extended or adjusted under 35 U.S.C. 154(b) by 0 days.

(21) Appl. No.: 09/412,690

(22) Filed: Oct. 5, 1999

Related U.S. Application Data (60) Provisional application No. 60/147,663, filed on Aug. 6, 1999.

(51) Int. Cl.[7] ............................................. B64C 29/00
(52) U.S. Cl. ...................... 244/7 R; 244/7 C; 244/5 C; 244/66; 244/75 R; 244/60; 74/665 R; 91/761
(58) Field of Search ................................ 244/213, 227, 244/7 R, 7 A, 7 B, 7 C, 75 R, 60, 66, 5 C; 416/142, 665 G, 665 H; 74/665 R, 665 F, 674, 388 PS; 91/361, 384; 464/32, 75, 97, 99, 23

(56) References Cited

U.S. PATENT DOCUMENTS

| | | | | |
|---|---|---|---|---|
| 4,088,284 | * | 5/1978 | Caswell ................................ | 244/7 R |
| 4,479,619 | | 10/1984 | Saunders et al. ...................... | 244/60 |
| 4,660,671 | * | 4/1987 | Behr et al. . | |
| 4,779,822 | * | 10/1988 | Burandt et al. ..................... | 244/75 R |
| 4,800,798 | * | 1/1989 | Boldrin et al. ...................... | 416/114 |
| 4,971,267 | * | 11/1990 | Fulton et al. ...................... | 244/75 R |
| 4,990,122 | * | 2/1991 | Grimm .............................. | 74/665 R |
| 5,054,716 | * | 10/1991 | Wilson ................................ | 244/7 R |

* cited by examiner

Primary Examiner—Galen L. Barefoot
(74) Attorney, Agent, or Firm—Melvin A. Hunn

(57) ABSTRACT

An improved tilting rotor aircraft, a control system for an elongated shaft, and a method of controlling an elongated shaft are provided. Sensors are utilized to detect an amount of twist on a flexible and elongated shaft. A controller receives the signal and generates a command signal. A plurality of actuators receive the command signals and compensate for the twist in the flexible and elongated shaft.

5 Claims, 9 Drawing Sheets

NOTE: Θ AND Ψ ARE DEFINED AS THE ANGULAR ROTATION OF THE RESOLVED ROTOR AND CORRESPOND TO ONE-HALF THE ANGULAR ROTATION OF THE RESOLVE INPUT SHAFT.

METHOD AND APPARATUS FOR CONTROLLING FORCE FIGHTS IN A ROTATING SHAFT

CROSS-REFERENCE TO RELATED APPLICATIONS

This application claims the benefit of U.S. Provisional Patent Application Ser. No. 60/147,663; filed Aug. 6, 1999, entitled Method and Apparatus for Controlling Force Fights in a Rotating Shaft.

BACKGROUND OF THE INVENTION

1. Field of the Invention

The present invention relates in general to systems utilized for controlling rotating shafts, and in particular to systems which are utilized to minimize twisting loads on rotating shafts.

2. Description of the Prior Art

In many industrial applications it is not uncommon to have a relatively long and flexible drive shaft which is driven by two or more motors (such as electric or hydraulic motors typically). The goal is to synchronize the operation of the motors to avoid "force fights" between the motors. Force fights are conditions under which the motors are acting counter to one another. This typically results from a lack of synchronization in the motors, but also can be due to the mechanical properties of the shaft. For example, when the shaft is relatively long and flexible it is more likely to be subjected to "force fights" between a plurality of motors which are coupled thereto. Force fights are undesirable for a number of reasons. First, they reduce the overall power transfer from the shaft to other mechanical equipment. For example, in aircraft, such as tiltrotor aircraft, it is not uncommon for such a shaft to lose as much as twenty or twenty-five percent of its total power due to force fights. Second, force fights can generate twisting loads on the shaft which can damage or even break the shaft. In general, drive shafts that are subject to force fights are also subject to an increased occurrence of fatigue loads which in general result in part failure.

In the prior art, attempts have been made to better coordinate the operation of the motors which drive the shaft in an effort to minimize or eliminate force fights. These efforts have been only moderately successful. When hydraulic motors are coupled to the drive shaft, a controller has been utilized to individually control a number of electrical hydraulic valves (EHVs). A sensor assembly is utilized to detect excessive twists or the occurrence of force fights. The sensor data is provided as an input to a controller. The controller supplies command signals to the electrical hydraulic valves to moderate the operation of the hydraulic motors, all in a manner which attempts to reduce or minimize twisting loads on the shaft due to force fights from motors which are slightly out of synchronization. One central problem encountered in the prior art is that, in complex mechanical systems with a variety of individual parts, the operating tolerances on the individual parts combine to provide a substantial range of normal operation for the parts. It is difficult for the sensor assembly and controller to accurately measure and rapidly respond to conditions which indicate that undesirable twisting loads are present in the shaft due to force fights between motors.

SUMMARY OF THE INVENTION

It is one objective of the present invention to provide a control system which minimizes or eliminates the occurrence of force fights between motors which are cooperatively driving a single drive shaft.

It is another objective of the present invention to provide a control system which provides a simple numerical indicator of twisting forces acting on a drive shaft.

It is yet another objective of the present invention to provide a control system for use in minimizing force fights in a rotating drive shaft, which utilizes electrical resolver components in order to develop a relatively simple single numerical indicator of twisting loads on the drive shaft.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the preferred embodiment when read in conjunction with the accompanying drawings, wherein:

DETAILED DESCRIPTION OF THE INVENTION

Figure 1:
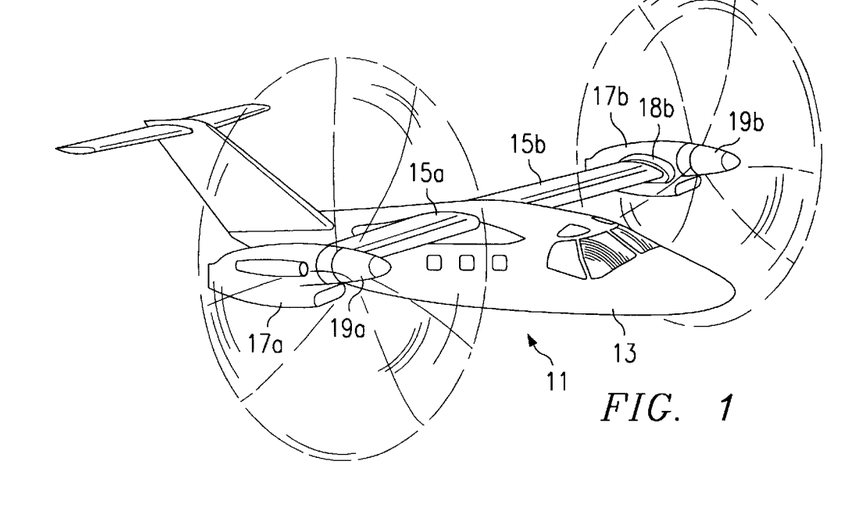
FIG. 1 is a perspective view of a tiltrotor aircraft in an airplane mode of operation.
Figure 2:
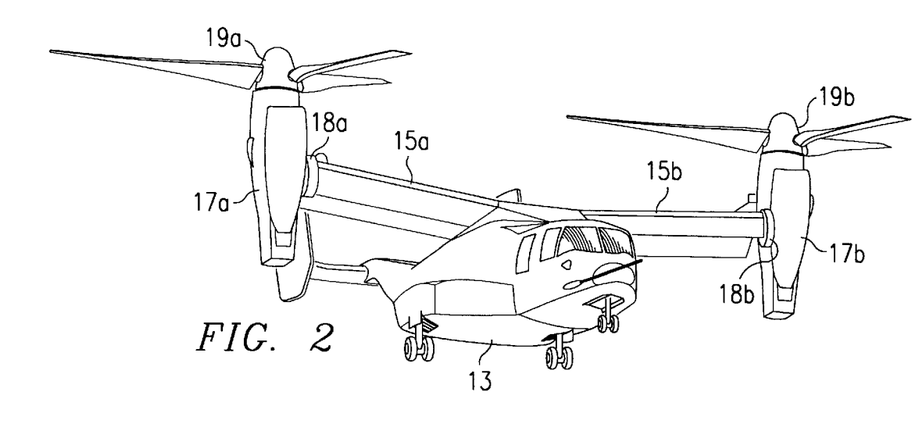
FIG. 2 is a perspective view of a tiltrotor aircraft in a helicopter mode of operation.

Referring to FIGS. 1 and 2 in the drawings, a typical tiltrotor aircraft 11 is illustrated. Tiltrotor aircraft 11 has an airframe 13 and wings 15a and 15b coupled to airframe 13. As is conventional, wings 15a and 15b terminate with tiltrotor assemblies 17a and 17b, respectively. Fairings 18a and 18b for reducing drag are disposed between tiltrotor assemblies 17a and 17b and wings 15a and 15b. Tiltrotor assemblies 17a and 17b each generally include an engine, a transmission and gear box for driving prop-rotors 19a and 19b, and a conversion actuator for actuating tiltrotor assemblies 17a and 17b between an airplane mode, as illustrated in FIG. 1A, and a helicopter mode, as illustrated in FIG. 2. In the airplane mode, tiltrotor aircraft 11 can be flown and operated like a conventional fixed-wing propeller driven aircraft. In the helicopter mode, tiltrotor aircraft 11 can take-off, hover, land, and be operated like a conventional rotary wing aircraft or helicopter. In the airplane mode of flight the rotor disk is positioned substantially transverse to the air frame; in contrast, in the helicopter mode of flight the rotor disk is substantially parallel to the air frame.

Figure 3:
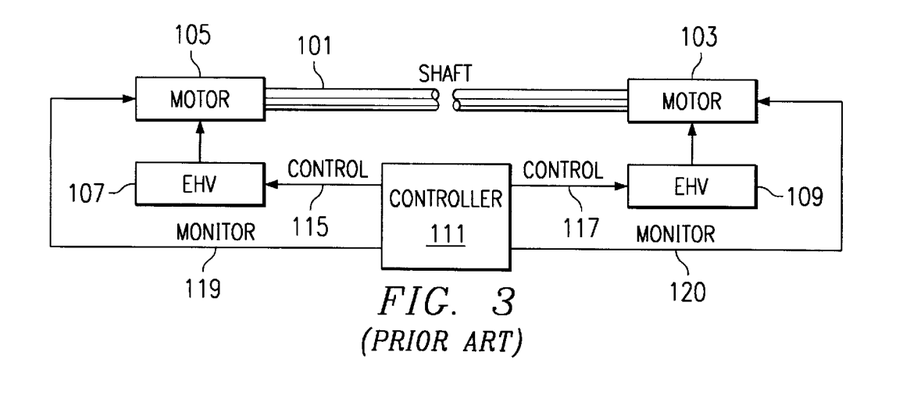
FIG. 3 is a block diagram representation of one prior art approach for controlling force fight in a drive shaft of a V-22 tiltrotor aircraft.

FIG. 3 is a simplified block diagram representation of the prior art control system utilized in the V-22 tiltrotor aircraft in order to detect and minimize force fights between two hydraulic motors 103, 105 on one actuator gear box. The force fights are detected by utilizing a complex closed-loop algorithm that uses monitored actuator motor pressure to determine the load sharing between motors 103, 105. Because of large changes in motor pressure and gear box efficiencies that occur with changes in temperatures, the V-22 force fight control system is relatively ineffective at low temperatures. As is shown in the view of FIG. 3, controller 111 is utilized to provide control signals to electrical hydraulic valves (EHVs) 107, 109. Electrical hydraulic valve 107 is utilized to supply pressurized hydraulic fluid to motor 105. The control signal sent over control line 115 increases or decreases the amount of high pressure hydraulic fluid directed through EHV 107 to motor 105. The same is true for motor 103. Controller 111 supplies control signals over control line 117 to EHV 109. EHV 109 in turn increases or decreases the amount of high pressure hydraulic fluid which is supplied to hydraulic motor 103. Motors 103, 105 cooperate to rotate drive shaft 101 at relatively high speeds. In accordance with this prior art approach, hydraulic pressure in one or more motors is monitored over monitor lines 119 and 120 by controller 111. Controller 111 contains a mathematical model which maps pressure information from monitor lines 119, 120 to an amount of twist or force fight present in drive shaft 101 and drive motors 103, 105. It sends control signals through control lines 115, 117 to electrical hydraulic valves 107, 109 to increase or decrease the high pressure hydraulic fluids applied to motors 103, 105.

Figure 4:
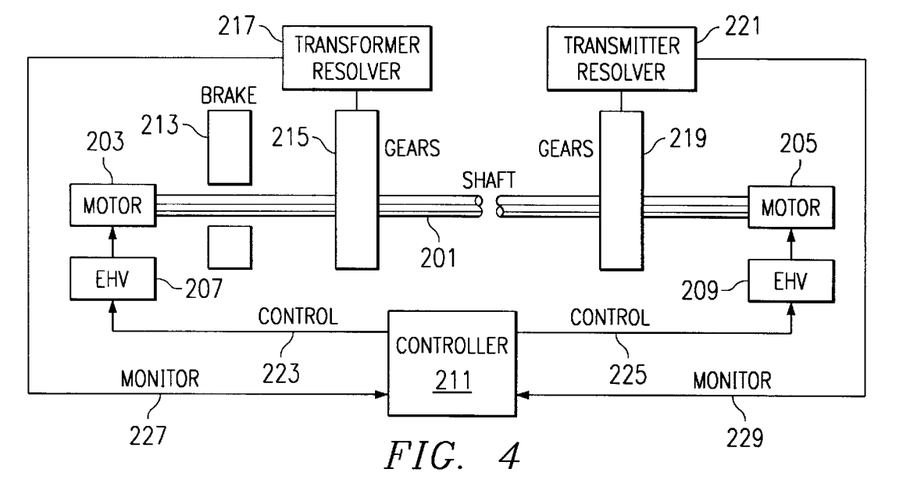
FIG. 4 is a block diagram representation of a first embodiment of a force fight control system in accordance with the present invention.

FIG. 4 is a simplified block diagram view of the first embodiment of the force fight control system of the present invention. As is shown, a relatively elongated and flexible drive shaft 201 is provided to transmit power in a mechanical system, such as a tiltrotor aircraft. A plurality of motors are physically coupled to drive shaft 201, rotating it at a relatively high rate of rotation. In the view of FIG. 4, exemplary motors 203, 205 are shown coupled to drive shaft 201. A greater number of motors may be coupled to drive shaft 201. In the embodiment of FIG. 4, motors 203, 205 are hydraulic motors which rotate in response to receipt of high pressure hydraulic fluid. In alternative embodiments, motors 203, 205 may comprise electrical motors, or any other suitable alternative. As is shown in FIG. 4, electrical hydraulic valves 207, 205 are provided to supply high pressure actuating fluid to motors 203, 205. Electrical hydraulic valves 207, 209 are under the direct control of controller 211, which is preferably a microprocessor or industrial controller which is suitable for executing program instructions. The control signals are supplied to electrical hydraulic valves 207, 209 via control lines 223, 225. Drive shaft 201 may also be coupled to one or more brakes, such as brake 213 which is utilized to slow or stop the rotation of drive shaft 201. Brake 213 may be under the control of controller 211, or it may be under the control of some other system or subsystem within the aircraft. A plurality of brakes may be provided which mechanically and selectively engage drive shaft 201, but, in order to simplify this exposition, a single brake 213 is depicted which is representation of one or more brake or braking systems.

In accordance with the preferred embodiment of the present invention, a set of gears 215, 219 are coupled mechanically to drive shaft 201 in order to allow for monitoring of drive shaft 201 in order to determine the extent and amount of twisting loads on drive shaft 201 in order to determine whether or not force fights are occurring between motors 203, 205. Transformer resolver 217 is coupled mechanically to gears 215 at one portion or region of drive shaft 201. Transmitter resolver 221 is coupled to gears 219 at another, different portion or region of drive shaft 201. Transformer resolver 217 and transmitter resolver 221 supply monitor signals via monitor channels 227, 229 to controller 211. Controller 211 analyzes the monitor signals supplied by transformer resolver 217 and transmitter resolver 221 in order to determine what particular control signals should be sent to electrical hydraulic valves 207, 209 via control lines 223, 225. Controller 211 may increase or decrease the amount of high pressure hydraulic fluid supplied to either or both of motors 203, 205 in order to compensate for a detected force fight between motors 203, 205 which manifests itself as a detected twisting load acting on shaft 201. During normal operations, drive shaft 201 is rotated at very high speeds by motors 203, 205, while transformer resolver 217 and transmitter resolver 221 continuously monitor for twisting loads and supply monitor signals to controller 211. Controller 211 dynamically and continuously supplies control signals to electrical hydraulic valves 207, 209 in order to compensate for the detected twisting load on drive shaft 201.

Figure 5:
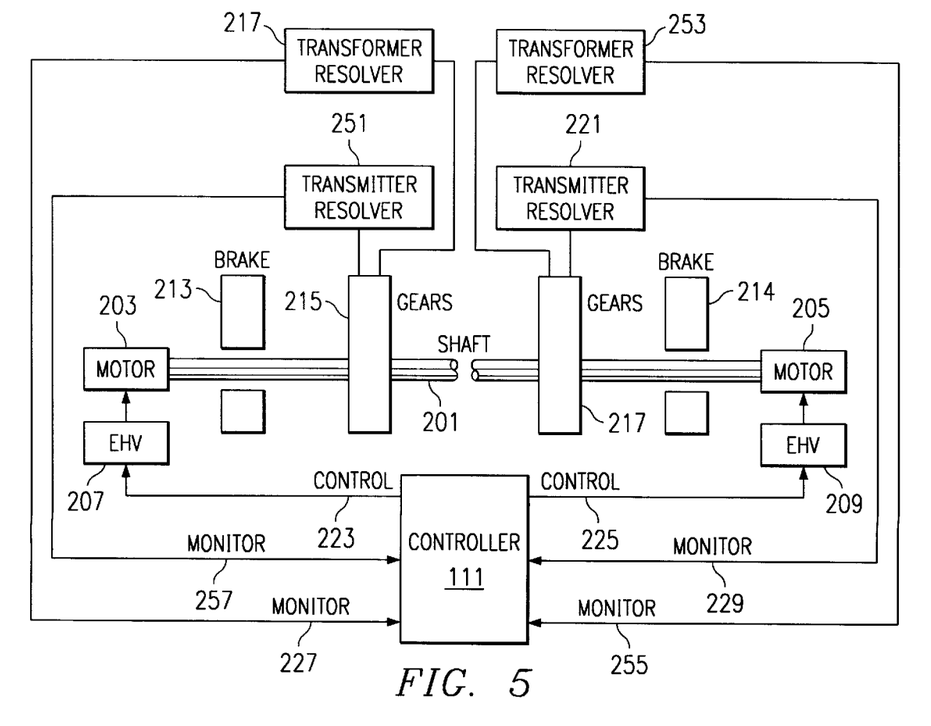
FIG. 5 is a block diagram representation of a second embodiment of a force fight control system in accordance with the present invention.
Figure 6:
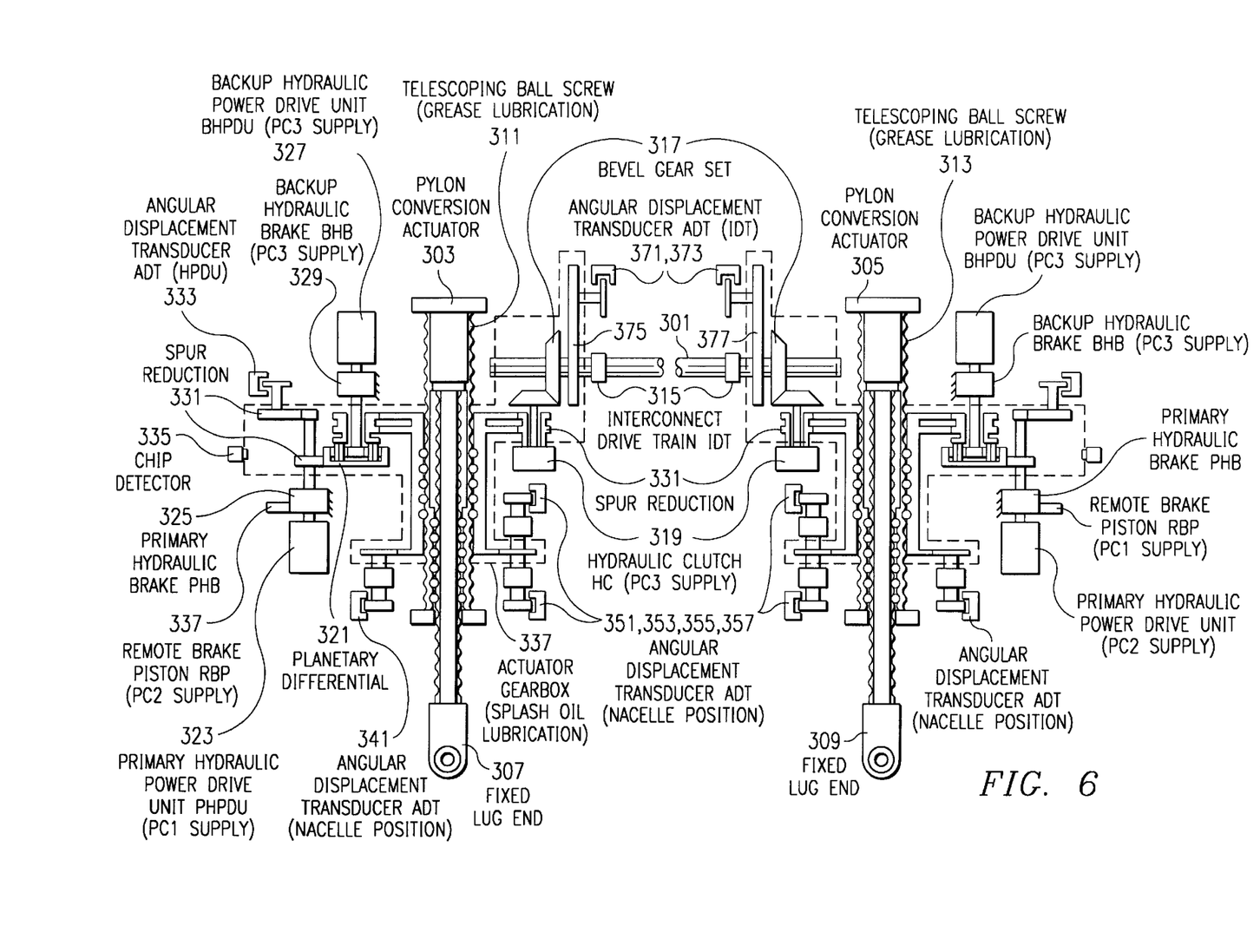
FIG. 6 is a schematic representation of the mechanical components of the second embodiment of the force fight control system of the present invention.

The embodiment of FIG. 4 combines information obtained form the transformer resolver 217 and the transmitter resolver 221 in order to provide a single numerical indicator of the amount of twist detected in drive shaft 201. Since redundancy of control is a fundamental requirement of most flight systems, there should preferably be at least two separate data channels for monitoring twisting loads on drive shaft 201. FIGS. 5 and 6 are a representation of a second embodiment of the force fight control system of the present invention which provides two independent separate data channels in order to provide two independent measurements of the twisting load on drive shaft 201. This provides the necessary and desirable redundancy of monitoring signals which is essential for safe flight operations.

Since many of the components of the first embodiment of FIG. 4 and the second embodiment of FIGS. 5 and 6 are similar, similar reference numerals are utilized, where appropriate, and new reference numerals are utilized to indicate new components introduced in the second embodiment which were not present in the first embodiment.

Referring now to FIG. 5, the second embodiment is depicted in block diagram form. As is shown, relatively elongated and flexible shaft 201 is provided as part of a power transmission or the mechanical system. In the preferred embodiment, the shaft is utilized in a tiltrotor aircraft; although, alternative commercial uses are obvious and contemplated, including uses that are in plant or other commercial facilities which are not in any way related to vehicles or aircraft. As is shown, a plurality of motors including motors 203, 205 are mechanically coupled to shaft 201. In this embodiment, the motors are hydraulic motors, but in alternative embodiments electrical or other motors can be utilized. Motors 203, 205 operate to rotate shaft 201 at a high rate of rotation. High pressure hydraulic fluid is supplied as an input to motors 203, 205 through electrical hydraulic valves 207, 209. As is true for the first embodiment, electrical hydraulic valves 207, 209 are under the direct control of controller 111 which is preferably a microprocessor or industrial controller which supplies command signals to increase or decrease the amount of high pressure hydraulic fluid supplied to electric hydraulic valve 207, 209 during normal operations. Preferably one or more braking systems, such as brakes 213, 214 are also in selective mechanical communication with drive shaft 201. They may be utilized to slow or stop the rotation of shaft 201 as is required by the particular application. In this embodiment, two gear assemblies 215, 217 are provided to allow for monitoring and detection of twisting loads which are applied to drive shaft 201.

As is depicted in FIG. 5, transformer resolver 217 and transmitter resolver 221 act as a pair to provide one independent data channel which provides a single numerical indication of the amount of twist load on drive shaft 201. This is a differential measurement in that transformer resolver 217 provides a measure from one portion of drive shaft 201, while transmitter resolver 221 provides a signal from another distally-located portion of drive shaft 201. In the embodiment of FIG. 5, a second independent channel also provides a single numerical indication of the amount of twisting load on drive shaft 201. More particularly, transmitter resolver 251 and transformer resolver 253 provide together a separate independent numerical indication of the twisting load on drive shaft 201. Transmitter resolver 251 is mechanically coupled to drive shaft 201 through gears 215, while transformer resolver 253 is mechanically coupled to drive shaft 201 through gears 217. In accordance with this particular embodiment of the present invention, the combination of signals from transformer resolver 217 and transmitter resolver 221 provides one independent single numerical indication of the twisting load on drive shaft 201, while transmitter resolver 251 and transformer resolver 253 provide another separate and independent numerical indication of the twisting load on drive shaft 201.

Under most conditions, the single numerical value developed by each independent channel should be identical. Should some of the equipment fail, a single channel would be sufficient to continue operations until repairs can be made. Additional levels of redundancy can also be superimposed in addition to these two redundant channels. In accordance with the embodiment of FIG. 5, controller 111 receives monitoring signals from transformer resolver 217 and transmitter resolver 251 from one portion of drive shaft 201, and also receives and monitors signals from transformer resolver 253 and transmitter resolver 251 from another portion of drive shaft 201. Controller 111 combines the data in a manner which provides the two independent measurements of the twisting load on drive shaft 201.

FIG. 6 is a pictorial and schematic representation of the mechanical components which are utilized in interconnect drive train 301 which mechanically links pylon conversion actuators 303, 305 and which is utilized to measure load sharing between the pylon conversion actuators 303, 305. As is shown in the view of FIG. 6, the pylon conversion actuators 303, 305 terminate at an opposite end with a fixed lug 307, 309. On each pylon conversion actuator 303, 305 a telescoping ball screw 311, 313 is provided. As is shown, the mechanical systems are symmetrical. They include a bevel gear set 315, spur reduction gears 317, and a hydraulic clutch 319. Each rotor assembly has associated with it a planetary differential 321. Each is mechanically driven by primary hydraulic power drive unit 323, and is braked by primary hydraulic brake 325. A remote brake piston 337 is also provided. A back up hydraulic power drive unit 327 is also provided to supplement the primary hydraulic drive unit 323. Additionally, a back up hydraulic brake system 329 is provided to back up the primary hydraulic brake system 325. The operation of these systems is monitored through angular displacement transducer 333 which is mechanically coupled through spur reduction gears 331 within gear box 337. A chip detector 335 is provided to detect magnetic particles in the gear box which indicate damage or wear. The angular position of pylon conversion actuator 303 is monitored by angular displacement transducer 341. The position of the tiltrotor is monitored by angular displacement transducers 351, 353, 355, 357. In this manner, each rotor assembly has its own primary and back up drives and brake units. However, the operation of the tiltrotors is coordinated through drive shaft 301 and loads are measured and balanced through drive shaft 301. As is shown, angular displacement transducers 371, 373 are mechanically coupled through gears 375, 377 to different portions of drive shaft 301 and are utilized to develop electrical signals which quantify the amount of twists on drive shaft 301. As discussed above, the angular displacement transducers 371, 373 are two pairs of resolver transformer/resolver transmitter devices which generate electrical signals which can be combined to provide a single numerical indication of the amount of twists of drive shaft 301. The resolver transformer and transmitter pairs are discussed above, but will be now be discussed in detail.

Figure 7:
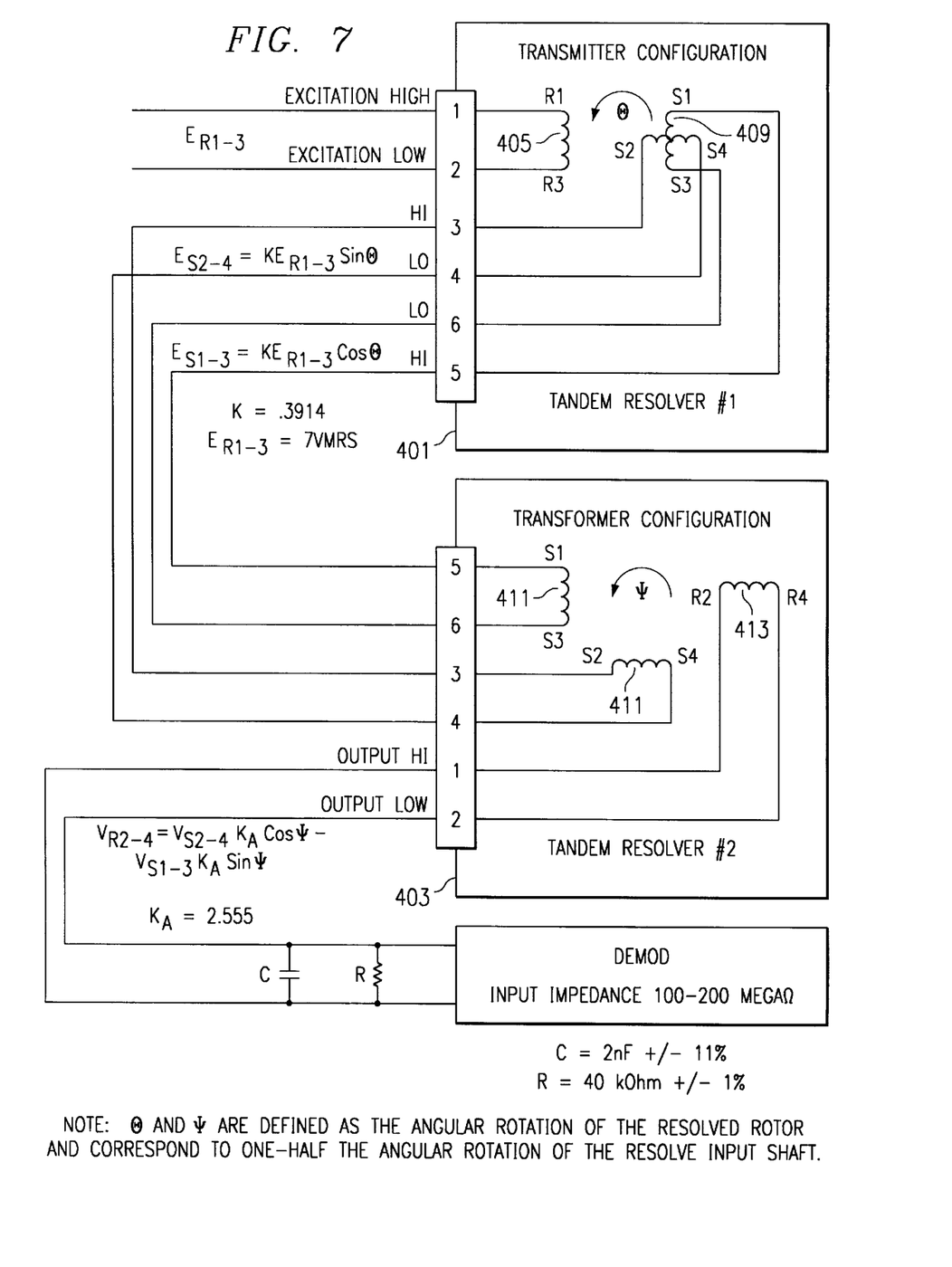
FIG. 7 is an electrical schematic representation of one resolver transmitter/transformer pair in accordance with the first embodiment of the force fight control system of the present invention.

FIG. 7 is an electrical schematic of a resolver transmitter/transformer pair. As is shown, resolver transmitter 401 is electrically connected to resolver transformer 403. Resolver transmitter 401 includes a primary winding 405 which is a cylindrical, two-phase perpendicular rotor winding. The primary winding 405 is inductively coupled to a symmetrical two-phase, perpendicular stator winding 409 (represented in the view as indicator 51–53 and indicator 52–54). The resolver transmitter 401 generates a sine output and a cosine output in response to rotation. The output data is representative of the angular position of the rotor. Resolver transformer 403 employs a symmetrical two-phase perpendicular stator winding as the primary windings 411 (represented in the view as inductor S1–S3 and inductor S2–S4) which is inductively coupled to a cylindrical single-phase rotor winding 413 (inductor R2–R4). Resolver control transformer stators 411 are excited by either a resolver transmitter stator 409 or a resolver differential rotor winding 413. To reduce loading effects resolver control transmitter 403 has medium to high impedance stator windings. When the resolver control transformer 401 is mechanically positioned, single-phase electrical data is generated on the rotor winding 413. This output data is proportional to the sine of the difference between the electrical input angle of the resolver transmitter 401 or the resolver differential and the resolver control transformer rotor angle. With no twisting load applied to the drive shaft, the resolver transformer generates a sine output. In contrast, with no twisting load on the drive shaft, the resolver transmitter generates a cosine output. The combination of these waveforms is essentially zero output. However, when maximum twisting loads (in this particular application the maximum of 10% twisting load is all that can be monitored) the outputs of the resolver transformer and/or resolver transmitter are shifted to add the signals together and generate a non-zero output. Experimentation has revealed that the amount of twisting between zero degrees and ten degrees of twist is essentially linear. Accordingly, varying amounts of phase shifting of the sine and cosine signals will generate all additive output (preferably RMS) which provides a linear identification of the amount of twisting. In accordance with the present invention, the controller is utilized to selectively actuate one or more hydraulic motors in order to abate the detected twisting.

With reference again to FIG. 7, an excitation current is supplied to primary winding 405 of resolver transmitter 401.

The excitation current is seven volts RMS. In the view of FIG. 7, this is applied between pins 1 and 2 of resolver transmitter 401. The frequency of the excitation signal is very high (thousands of Hertz). The resolver transmitter 401 generates two outputs. One output is between output pins 3 and 4 and is representative of the sine output. The output is a function of the stimulating current, a constant, and a sine of the angle. The second output is a cosine signal which is developed between pins 5 and 6 and which is a function of a constant, the excitation current, and the cosine of the angle. The sine and cosine signals are supplied to terminals 3, 4, 5, and 6 of the resolver transformer 403. The output developed by resolver transformer 403 is a function of the sine and cosine of the angle between the stators and the rotor. The formula for the output is provided in the view of FIG. 7. Essentially, the voltage output from pins 1 and 2 of resolver transformer 403 is a function of the sine and cosine of the angle of rotation from one end of the shaft and the sine and cosine of the angle of rotation of the other end of the shaft. In this manner, the data is combined to determine a single value which is indicative of the amount of twist between the two ends of the shaft. More particularly, the system is utilized to measure the amount of rotation of one end of the shaft relative to the other, all as measured with respect to a stable frame of reference, such as the position of the airframe. Polarity is utilized in order to indicate the direction of twist.

Figure 8:
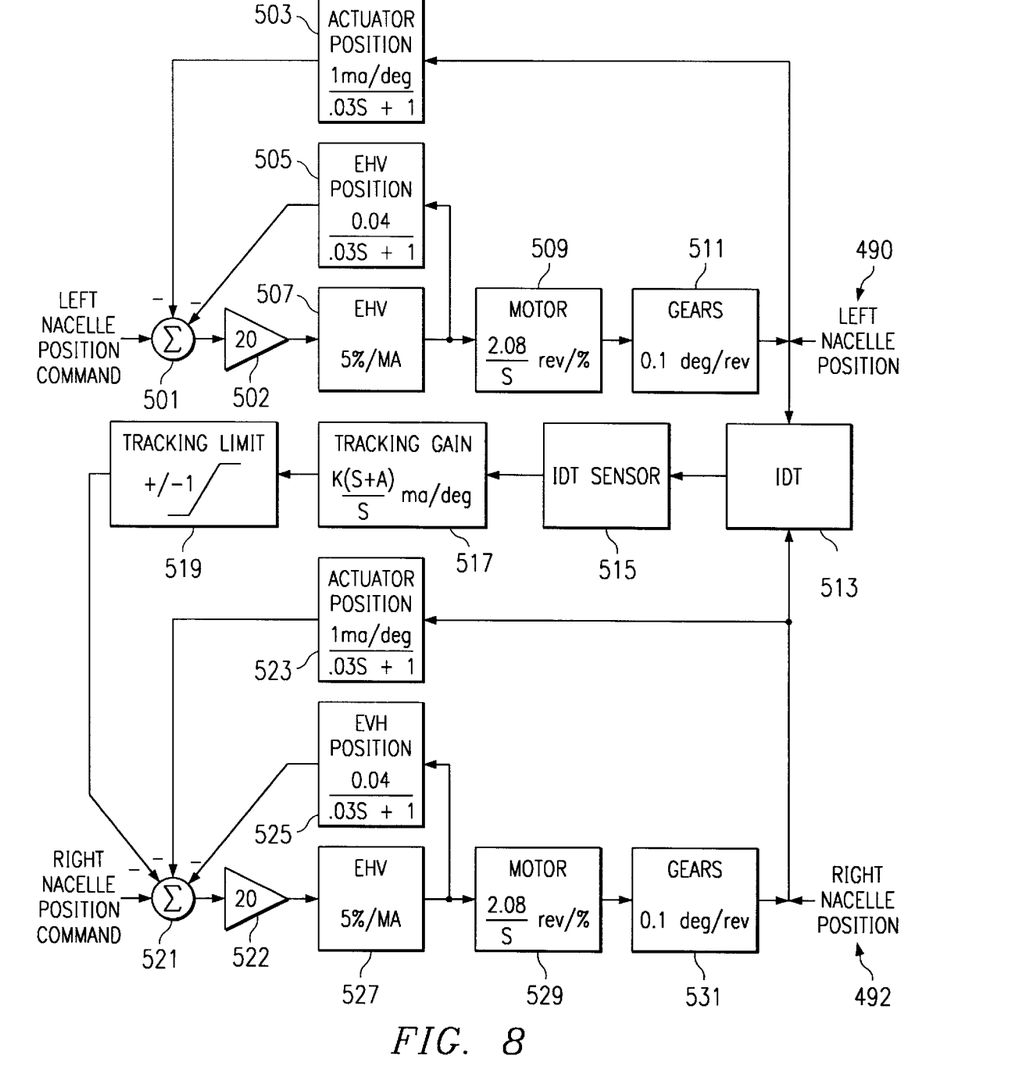
FIG. 8 is a block diagram representation of the preferred force fight control system of the present invention.

FIG. 8 is a block diagram view of the preferred control system utilizing the present invention. As is shown, the left nacelle 490 and the right nacelle position 492 are applied to the interconnecting drive train IDT 513. The position of the interconnecting drive train 513 is sensed directly by IDT sensor 515. The output of IDT sensor 515 is supplied as an input to tracking gain module 517, which represents a frequency sensitivity gain which is used to eliminate the twist in the IDT. The resulting output signal is limited by tracking limit module 519 which controls how much authority can be used to equalize the two nacelle positions. Making the nacelles' position equal is what eliminates the twist in the IDT. To put it simply, the twist in the IDT is measured, and the resulting signal is used to command the right nacelle position to track the left nacelle position, which eliminates the twist in the IDT. The output of the tracking limit module 519 is supplied as an input to right nacelle position command input 521. Right nacelle position command input 521 receives negative feedback from tracking limit module 519, but it also receives negative feedback from the actuator position 523 which provides an indication of the actuator position, as well as from EHV position module 525 which provides an indication of the EHV position. The three negative feedback loops are summed and supplied as an input to amplifier module 522 which amplifies the signal and supplies it as an input to the EHV (electrical hydraulic valve) with electrical hydraulic valve position changing five percent per milliamp input. The electrical hydraulic valve is supplied as an input to motor 529 which is supplied as an input to the gears 531.

The left nacelle position is monitored by actuator position module 503. The output of actuator position module 503 is supplied to left nacelle position command input 501. Similarly, two negative feedback loops are provided. Negative feedback is provided from actuator position module 503, but negative feedback is also provided from EHV position sensor 505. The left nacelle position signal is combined with a negative feedback and supplied as an input to amplifier module 502. The output of the amplified signal is supplied as an input to EHV 507. The output of EHV 507 is applied as an input to motor module 509. The output of motor module 509 is applied as input to gears module 511.

FIGS. 9, 10, 11 and 12 depict in simplified form four resulting output signals for four different twist conditions. FIGS. 9A through 9D depict a situation in which the left end is rotated plus twenty-five degrees and the right end is twisted a negative twenty-five degrees from an arbitrary reference point, resulting in a total IDT twist of fifty degrees. The representation is simplified in that the excitation signal depicted in FIG. 9A is depicted at a much lower frequency than is actually utilized. There are several orders of magnitudes in difference between the frequency of the excitation signal and the rate of rotation of the shaft. The excitation signal is a constant amplitude, constant frequency, excitation signal of a relatively high frequency in comparison to the rate of rotation of the shaft.

Figure 9A:
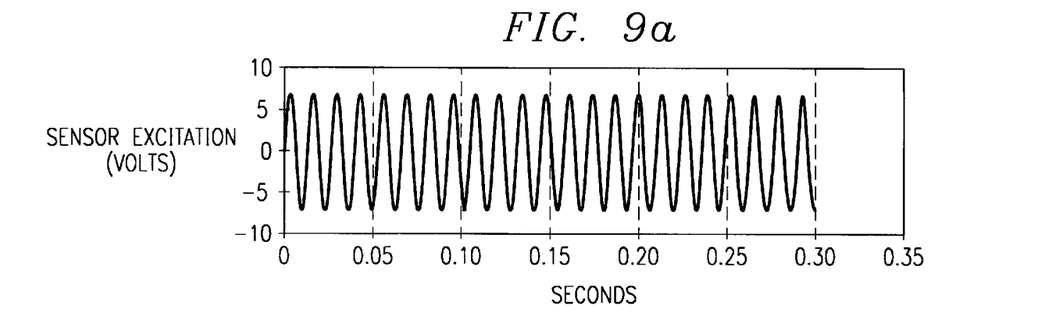
FIGS. 9, 10, 11 and 12 are graphical representations of exemplary signals generated by the resolver transformer and resolver transmitter pairs of FIG. 7.
Figure 9B:
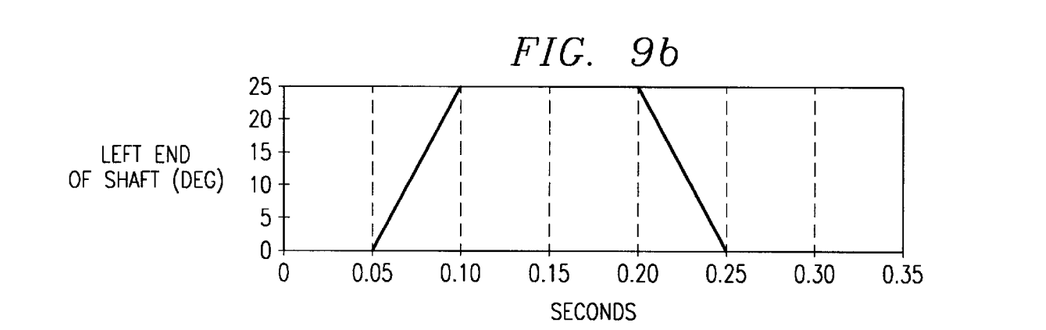
Figure 9C:
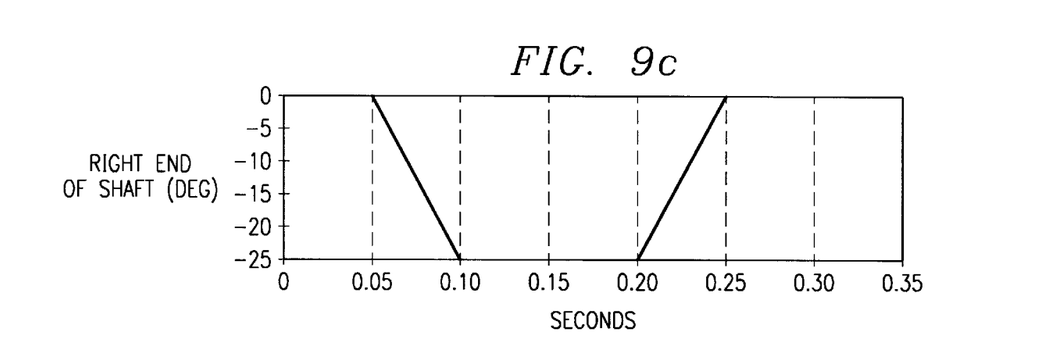
Figure 9D:
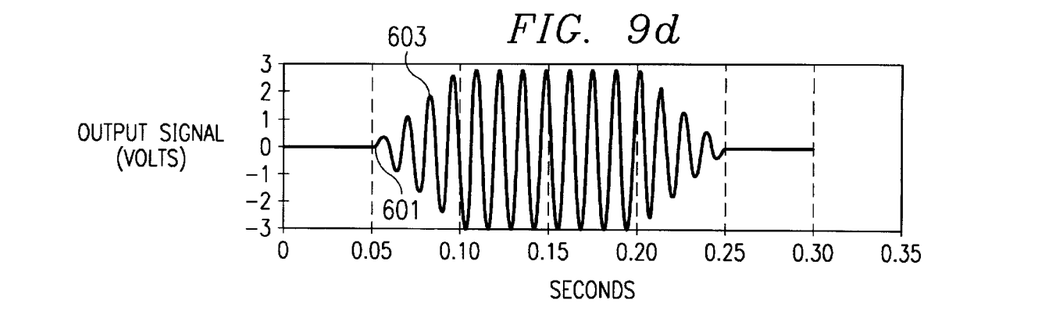
Figure 10A:
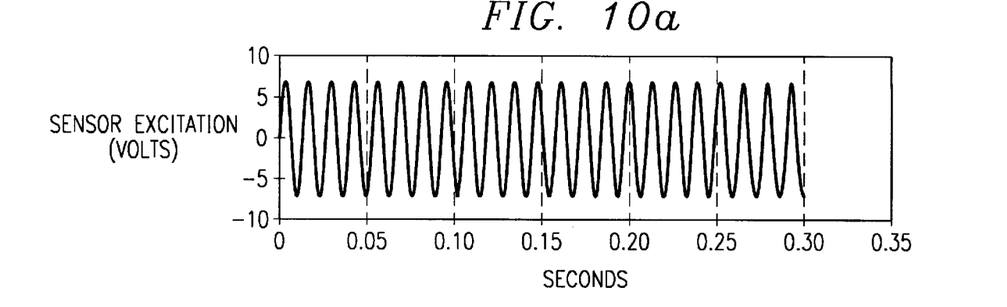
Figure 10B:
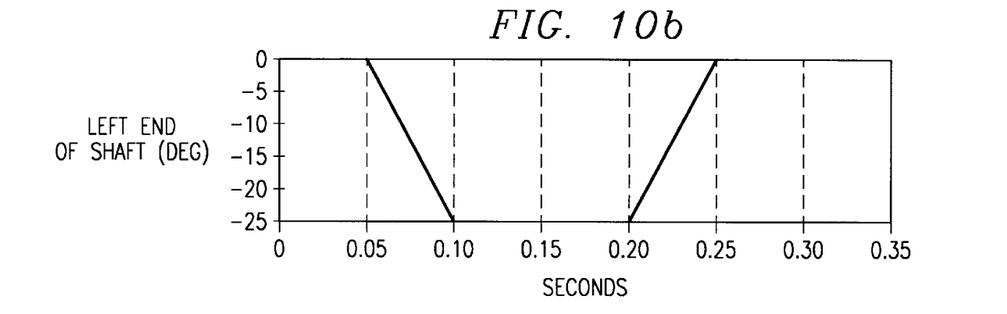
Figure 10C:
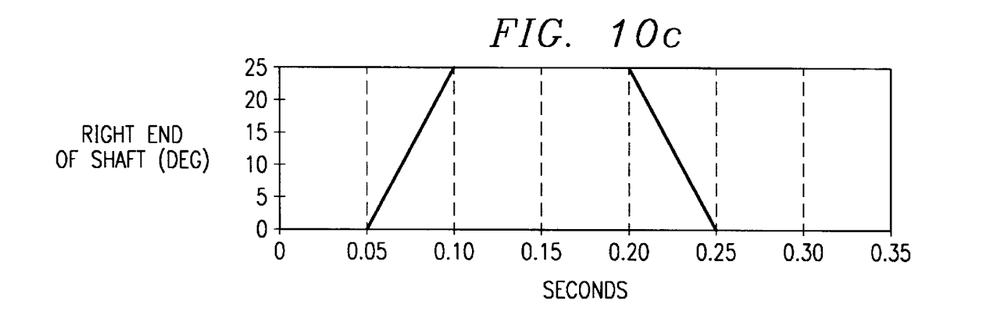
Figure 10D:
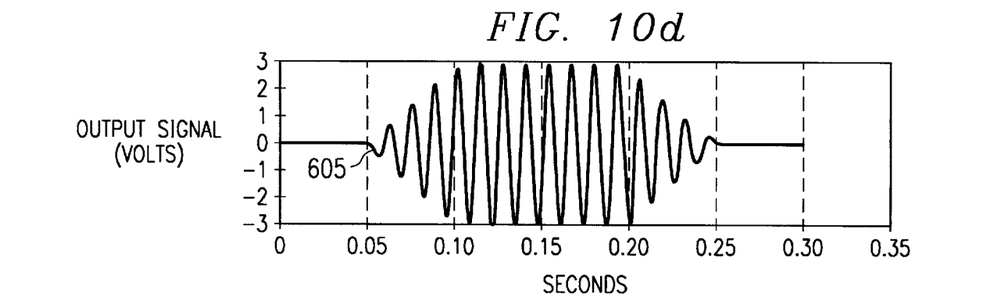
Figure 11A:
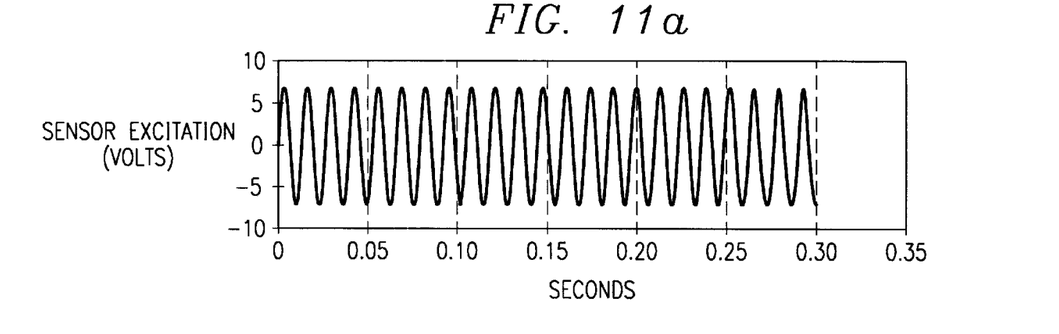
Figure 11B:
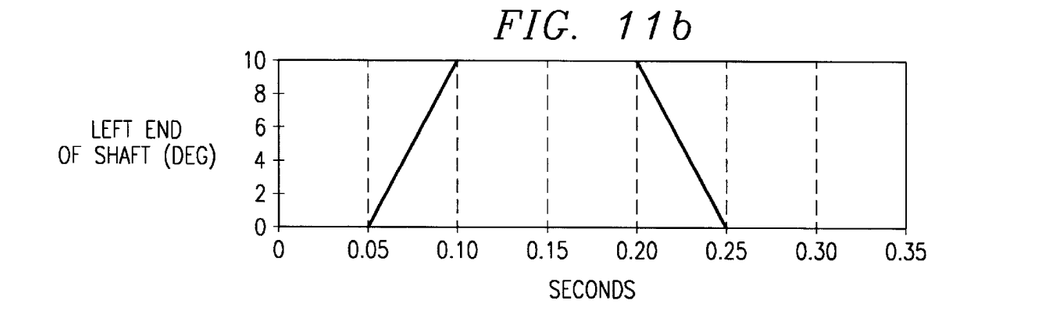
Figure 11C:
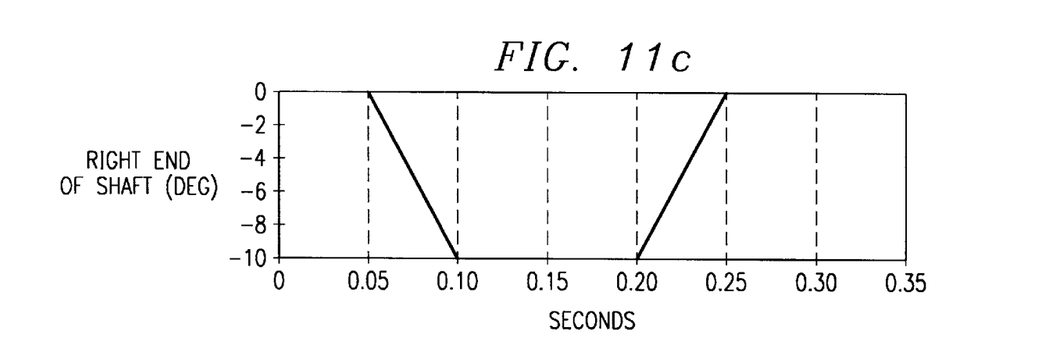
Figure 11D:
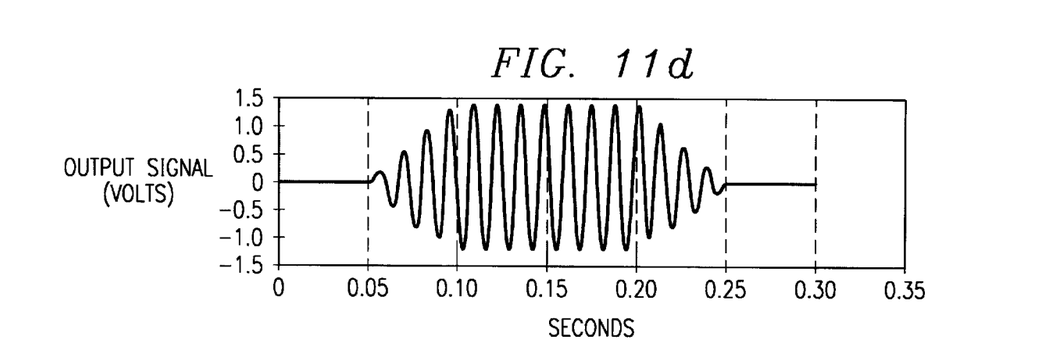
Figure 12A:
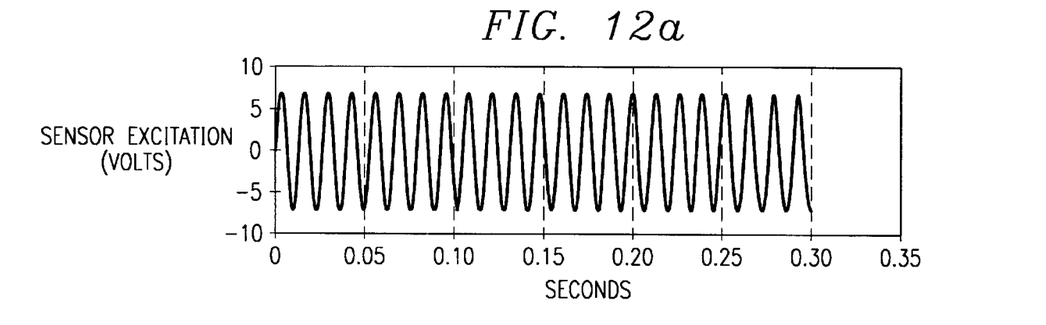
Figure 12B:
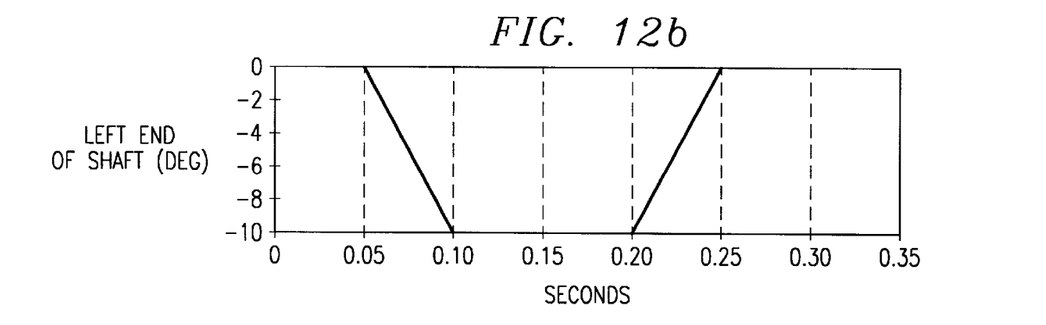
Figure 12C:
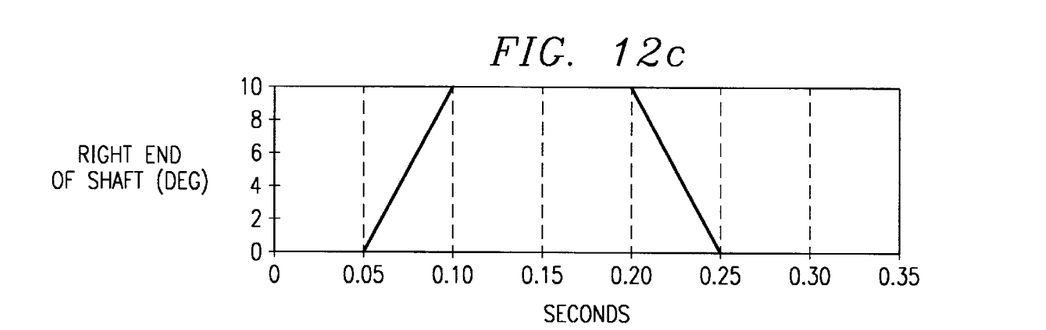
Figure 12D:
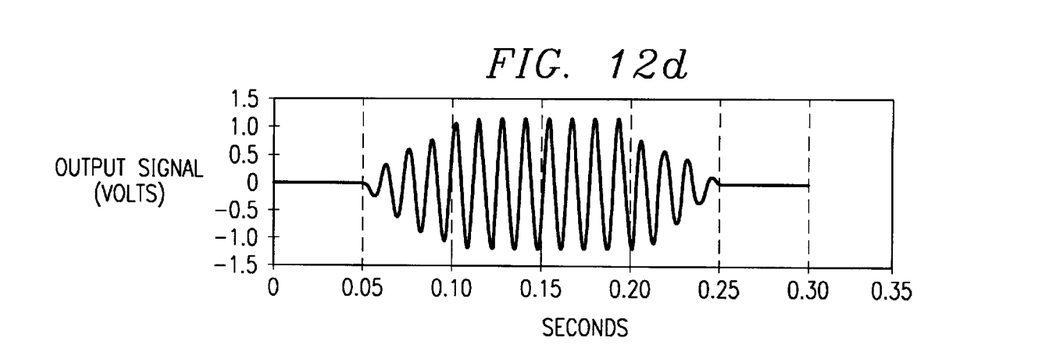

FIG. 9B is a graphical representation of the amount of rotation on the left end of the shaft with respect to time. In this view, the X-axis is representative of the time and seconds, while the Y-axis is representative of the degrees of rotation of the left end of the shaft. FIG. 9C is a graphical representation of the twist on the right end of the shaft with respect to time. The X-axis is representative of time in units of seconds, while the Y-axis is representative of the degrees of rotation measured at the right end of the shaft. FIG. 9D is representative of the output signal generated by the control system of the present invention. As is shown, the X-axis is representative of time in seconds, while the Y-axis is representative of the output signal in volts The amplitude of the output signal is a measure of the cumulative amount of twist on the shaft. The polarity of the twist is indicated by the phase angle of the signal. As is shown in FIG. 9D, the direction in which the signal is going (positive or negative) indicates the polarity of the information. As is shown in FIG. 9D, the positive going portion 601 indicates a particular polarity.

FIGS. 10A, 10B, 10C, and 10D are identical to the situation depicted in FIGS. 9A through 9D, with the exception of the polarity of the twist. As is shown, the phase angle is 180° out of phase in FIG. 10D from that depicted in FIG. 9D. Accordingly, the polarity is different. In FIG. 9D, the negative-going portion 605 is identified to illustrate this point.

FIGS. 11 and 12 depict different amounts of twist on a shaft with different polarities. In both FIGS. 11 and 12, a total of 20° of IDT twist is depicted. As is shown, the amplitude of the output signal of FIGS. 11D and 12D are representative of 20° of IDT twist. However, the signals are 180° out of phase, which indicates differing polarity for the twist.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended clams will cover any such modifications or embodiments that fall within the scope of the invention.

What is claimed is:

1. An improved tilt rotor aircraft comprising:
   (a) an airframe;
   (b) a pair of wing members coupled to said airframe;
   (c) a pair of cooperating tilt rotor assemblies carried by said pair of wing members operate in a plurality of modes of operation, including at least:

(1) an airplane mode of flight with said pair of cooperating tilt rotor assemblies establishing a rotor disk position substantially transverse to said airframe;
(2) a helicopter mode of flight with said pair of cooperating tilt rotor assemblies establishing a rotor disk position substantially parallel with said airframe;
(3) a transition mode of flight with said pair of cooperating tilt rotor assemblies moving between said airplane mode of flight and said helicopter mode of flight;

(d) a flexible and elongated rotating shaft extending between said pair of cooperating tilt rotor assemblies;

(e) a plurality of assemblies for generating at least one signal indicative of an amount of twist on said flexible and elongated shaft;

(f) a controller for receiving said at least one signal and generating command signals;

(g) a plurality of actuators for receiving said command signals and for compensating for said twist in said flexible and elongated shaft.

2. An improved tilt rotor aircraft according to claim 1, wherein said at least one signal comprises a single numerical indicator of twist on said flexible and elongated shaft.

3. An improved tilt rotor aircraft according to claim 1, wherein said flexible and elongated drive shaft comprises a shaft for an interconnecting drive train.

4. A control system for an elongated shaft rotated by a plurality of motor systems, comprising:

(a) a controller adapted to provide control signals to said plurality of motor systems;

(b) a first sensor mechanically coupled to said elongated shaft at a first location for developing a first electrical signal which indicates an amount of twist present at the first location on said elongated shaft;

(c) a second sensor mechanically coupled to said elongated shaft at a second location for developing a second electrical signal which indicates an amount of twist present at the second location on said elongated shaft;

(d) wherein said first and second electrical signals are combined to provide a numerical indicator of twist on said elongated shaft; and (e) wherein said controller utilizes said numerical indicator in order to control said plurality of motor systems.

5. A method of controlling an elongated shaft rotated by a plurality of motor systems, comprising:

(a) providing a controller adapted to provide control signals to said plurality of motor systems;

(b) providing a first sensor mechanically coupled to said elongated shaft at a first location for developing a first electrical signal which indicates an amount of twist present at the location on said elongated shaft;

(c) providing a second sensor mechanically coupled to said elongated shaft at a second location for developing a second electrical signal which indicates an amount of twist present at the second location on said elongated shaft;

(d) providing said first and second electrical signals to provide a numerical indicator of twist on said elongated shaft; and (e) supplying said numerical indicator to said controller in order to control said plurality of motor systems.

* * * * *